United States Patent [19]
Hamadani et al.

[11] Patent Number: 5,845,083
[45] Date of Patent: Dec. 1, 1998

[54] MPEG ENCODING AND DECODING SYSTEM FOR MULTIMEDIA APPLICATIONS

[75] Inventors: Mehrdad Hamadani; Rom-Shen Kao, both of Durham, N.C.

[73] Assignee: Mitsubishi Semiconductor America, Inc., Durham, N.C.

[21] Appl. No.: 612,512

[22] Filed: Mar. 7, 1996

[51] Int. Cl.$^6$ .................................................. H04N 1/413
[52] U.S. Cl. .................... 395/200.61; 348/403; 711/217; 711/218; 382/232; 382/292; 382/301
[58] Field of Search ..................................... 370/468, 362, 370/363; 395/200.68, 200.77, 888, 200.61, 497.02; 348/403; 711/217, 218, 220; 382/232, 292, 301, 305

[56] References Cited

U.S. PATENT DOCUMENTS

| | | |
|---|---|---|
| 5,208,745 | 5/1993 | Quentin et al. . |
| 5,229,852 | 7/1993 | Maietta et al. . |
| 5,301,191 | 4/1994 | Otani ........................................ 370/468 |
| 5,321,522 | 6/1994 | Eschbach . |
| 5,321,750 | 6/1994 | Nadan . |
| 5,331,431 | 7/1994 | Jasinski . |
| 5,359,676 | 10/1994 | Fan . |
| 5,371,532 | 12/1994 | Gelman et al. . |
| 5,379,122 | 1/1995 | Eschbach . |
| 5,402,147 | 3/1995 | Chen et al. . |
| 5,404,437 | 4/1995 | Nguyen .................................... 395/806 |
| 5,418,713 | 5/1995 | Allen . |
| 5,422,674 | 6/1995 | Hooper et al. . |
| 5,425,101 | 6/1995 | Woo et al. . |
| 5,432,900 | 7/1995 | Rhodes et al. . |
| 5,438,370 | 8/1995 | Primiano et al. . |
| 5,442,747 | 8/1995 | Chan et al. . |

FOREIGN PATENT DOCUMENTS

WO 96/20567  12/1995  WIPO ............................. H04N 7/50

OTHER PUBLICATIONS

K. Morse and A.A. Rodrigues, "Trends in Hardware Acceleration for Digital Video on Personal Computers," Proceedings of the SPIE, vol. 2188, Feb. 8, 1994, pp. 300–311, XP000600325.

G.L. Chen, et al., "Video Encoder Architecture for MPEG2 Real Time Encoding," IEEE Transactions on Consumer Electronics, vol. 42, No. 3, Aug. 1996, pp. 290–299, XP000638505.

D. Kim, et al., "A Real–Time MPEG Encoder Using A Programmable Processor," IEEE Transactions on Consumer Electronics, vol. 40, No. 2, May 1, 1994, pp. 161–170, XP000459694.

*Primary Examiner*—Thomas Peeso
*Attorney, Agent, or Firm*—McDermott, Will & Emery

[57] ABSTRACT

A multimedia data encoding and decoding system capable of handling various types of data arranged in variable-size blocks. Frames of image, graphics and text data are supplied to a frame buffer. In response to an encoding command from a CPU, an MPEG encoder compresses the data from the frame buffer in accordance with the MPEG compression algorithm, and outputs to a texture buffer a variable-size data block that corresponds to the frame portion to be displayed. The size of the data block is set by the CPU, and may vary from one macroblock to, e.g., 22×16 macroblocks (one frame for MPEG-1). An MPEG decoder reads the variable-size data block from the texture buffer, decompresses and supplies it to a graphics engine that manipulates various type of data to create a picture to be displayed at a video monitor.

23 Claims, 5 Drawing Sheets

MPEG ENCODING AND DECODING SYSTEM FOR MULTIMEDIA APPLICATIONS

TECHNICAL FIELD

The present invention relates to signal processing, and more particularly, to a multimedia compression and decompression system that complies with the International Organization for Standardization (ISO)/International Electrotechnical Commission (IEC) Motion Picture Expert Group (MPEG) specifications.

BACKGROUND ART

Data compression may be provided in data processing systems to reduce the time of data transmission in communication links, or to transmit broad-bandwidth signals via narrow-bandwidth communication channels. Also, data compression may be used to increase the quantity of data that can be stored in a given space, or to decrease the space needed to store a given quantity of data.

The MPEG standards define a compression and decompression algorithm for motion-picture video services. One example of such a service is video on demand, wherein a subscriber interacts with a remote video storage to request the presentation of a particular movie or video program on the subscriber's TV set. Due to video compression, motion-picture images can be sent over a communication channel using only a fraction of conventional television channel. As a result, many more video channels can be carried over a given communication medium, such as television cable media. Moreover, conventional telephone links are enabled to deliver broad-bandwidth television signals.

In the MPEG algorithm, each frame of a motion-picture video is defined either independently, or as a change from a previously and/or future displayed frame. A video scene may be described by a single independent frame (I-frame) which shows the entire scene as it initially appears, followed by a long series of change frames (P-frames and/or B-frames) that describe the changes in the scene. Thus, the MPEG video compression technique eliminates the redundant transmission of unchanging elements of the scene.

Referring to FIG. 1 of the drawings, a conventional MPEG video compression/decompression system 10 comprises an image source 12, for example a video camera, or a video service storage for storing a motion-picture video. An MPEG encoder compresses image data from the image source 12 in accordance with the MPEG compression algorithm. The compressed image data are supplied to video service media 16, for example, to a TV cable or a telephone system for transmitting to a remote user. Alternatively, the compressed image data may be loaded into a local video storage for further retrieval by a local or remote user. An MPEG decoder 18 decompresses the compressed image data in accordance with the MPEG decompression algorithm, and supplies them to a video or TV monitor 20 that displays the received image.

The MPEG algorithm is defined in the following specifications: ISO/IEC 11172, November 1991 (MPEG 1), and ISO/IEC 13818, March 1995 (MPEG 2). As for MPEG-1, it handles a complete image to be displayed defined as a frame. The size of the frame is set equal to 22 macroblocks horizontally by 16 macroblocks vertically, where 1 macroblock composed of 6 blocks of image, among which 4 blocks represent luminance and 2 blocks represent chrominance. Each block of image contains 8×8 picture elements (pixels).

A typical implementation of MPEG system allows only image data to be compressed. No compression of graphics or text data associated with image is possible. Moreover, the conventional MPEG encoder manipulates only fixed-size frames representing a complete picture, even if only a portion of the picture is to be displayed. To accommodate the complete frame data, an intermediate buffer memory is required between the MPEG decoder and the image display. As a result of the intermediate data storage, the data delivery rate of the MPEG system is substantially reduced.

Therefore, it would be desirable to provide an MPEG encoding and decoding system that can handle multimedia data including graphics and text data as well as image data.

Also, it would be desirable to enable the MPEG encoding and decoding system controlled by an application program, to adaptively manipulate variable-size data so as to eliminate the need for intermediate data storage and hence increase MPEG data delivery rate.

DISCLOSURE OF THE INVENTION

Accordingly, one advantage of the invention is in providing an MPEG encoding and decoding system that allows multimedia data, including image, graphics and text data, to be compressed.

Another advantage of the invention is in providing an MPEG encoding and decoding system able to manipulate multimedia data arranged in variable-size blocks.

Further advantage of the invention is in providing an MPEG encoding and decoding system that uses no intermediate data buffering between a decoder and a display.

Another advantage of the invention is in increasing the data delivery rate of an MPEG encoding and decoding system.

The above and other advantages of the invention are achieved, at least in part, by providing a system for encoding and decoding multimedia data, including image, graphics and text data that comprises an encoder for compressing the multimedia data. A central processor controls the encoder so as to arrange the multimedia data compressed by the encoder in a block of a variable size. The block of the compressed data may be stored in a texture buffer. A decoder reads the data block from the buffer and decompresses it.

In accordance with a preferred embodiment of the invention, the encoder and the decoder provide data compression and decompression using the Motion Picture Expert Group (MPEG) algorithm.

In accordance with one aspect of the invention, the encoder comprises an address generator for generating address data to store the data block in the texture buffer. The address generator is responsive to a data size command from the central processor that indicates the size of the data block. The address generator is further responsive to a data type command from the central processor that indicates the type of the multimedia data compressed by the encoder. Separate image, graphics and text address outputs mat be provided to store the image, graphics and text data, respectively, in the texture buffer.

In accordance with another aspect of the invention, the decoder comprises an address generator for generating address data to read the data block from the texture buffer. The decoding address generator is responsive to the data size and data type commands from the central processor. Separate image, graphics and text address outputs may be arranged to indicate addresses for reading the image, graphics and text data, respectively, from the texture buffer.

The encoding and decoding system may comprise compression and decompression pipelines composed of units for carrying out sequences of encoding and decoding steps defined by the MPEG algorithm. Finite state machines are controlled by the central processor to enable various encoding units and various decoding units to operate simultaneously.

In accordance with a method of the present invention, the following steps are carried out:

inputting image, graphics and text data to be compressed, compressing by an encoder the image, graphics and text data in accordance with an MPEG compression algorithm, controlling the encoder so as to write into a buffer the compressed image, graphics and text data arranged in blocks of variable sizes, reading by a decoder the compressed image, graphics and text data from the buffer, controlling the decoder so as to read from the buffer the blocks of variable sizes, and decompressing the read image, graphics and text data in accordance with an MPEG decompression algorithm.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Although the invention has general applicability in the field of data encoding and decoding, the best mode for practicing the invention is based in part on the realization of a data compression and decompression system that complies with the MPEG standards.

Figure 1:
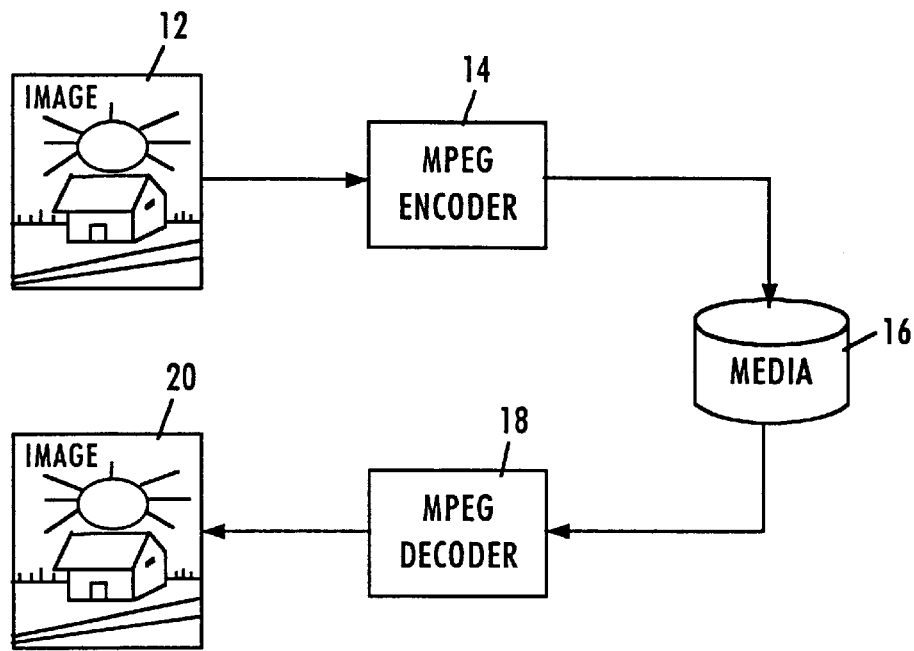
FIG. 1 is a block-diagram of a conventional MPEG encoding and decoding system.
Figure 2:
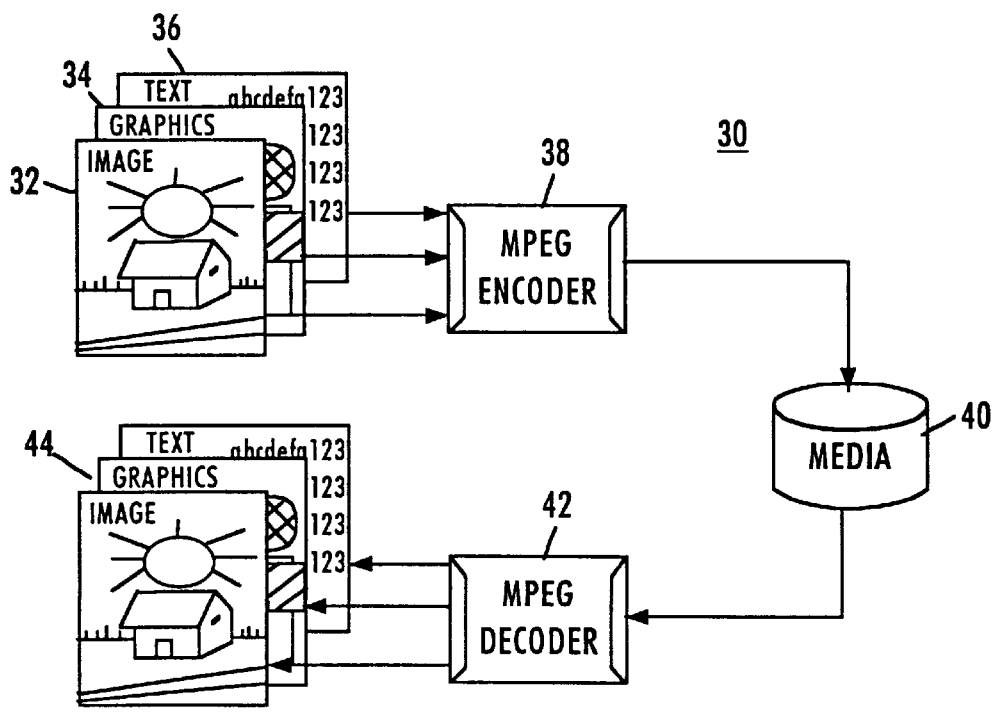
FIG. 2 is a block-diagram of an MPEG encoding and decoding system of the present invention.

Reference is now made to FIG. 2 of the drawings showing an MPEG encoding and decoding system 30 that handles multimedia data supplied by image, graphics and text sources 32, 34 and 36, respectively. A MPEG encoder 38 compresses the supplied multimedia data in accordance with the well known MPEG compression algorithm. The compressed multimedia data may be loaded into a data storage 40 or supplied through a communication channel to a remote user. An MPEG decoder 42 decompresses the compressed video data in accordance with the well known MPEG decompression algorithm, and supplies them to a multimedia monitor 44 that displays the decompressed image, graphics and text data. The MPEG encoding and decoding system of the present invention may be used for handling multimedia data in a personal computer, for supplying remote users with multimedia data from a central location, or for other applications that require a substantial amount of multimedia data to be processed.

Figure 3:
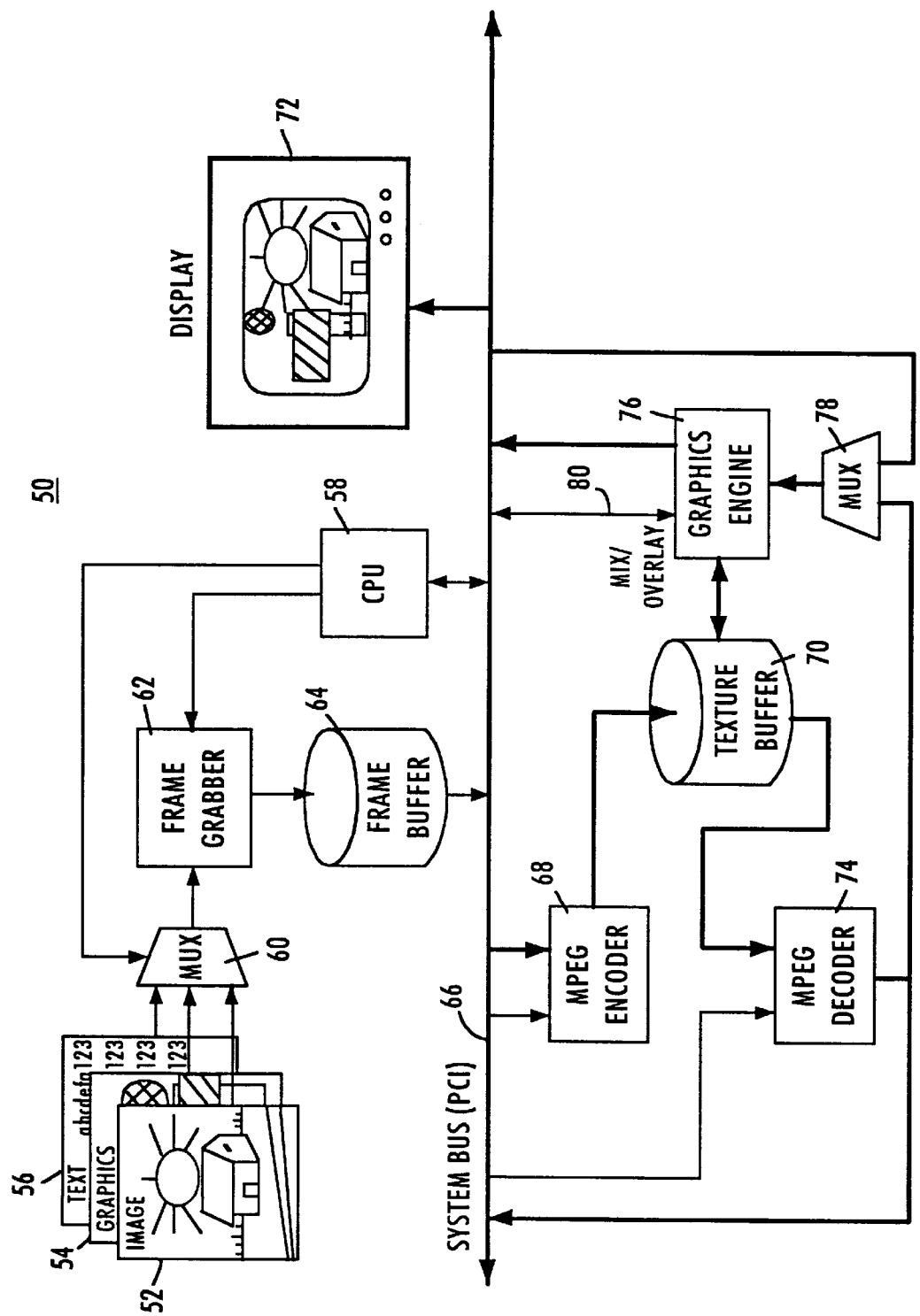
FIG. 3 is a diagram illustrating implementation of the present invention in a personal computer.

Referring to FIG. 3, an MPEG encoding and decoding system 50 in a personal computer may have three input sources of data: an image source 52, a graphics source 54 and a text source 56. For example, the image source 52 may comprise a video camera and an analog-to-digital converter that digitizes an image produced by the video camera. The graphics source 54 and the text source 56 may be represented by communication links that carry graphics and text data. Alternatively, graphics and text data may be produced by graphics and text generators.

A central processing unit (CPU) 58 of the personal computer supplies an input multiplexer 60 with a command that defines a type of data to be input. The type of data command generated to input image, graphics or text data is defined by an application program run by the personal computer. One of the input data sources 52, 54 or 56 at a time may be selected. The image, graphics and text data are supplied as a pixel stream. One pixel of the selected data at a time is provided at the output of the multiplexer 60. A frame grabber 62 captures the selected data and loads them into a frame buffer 64 having the storage capacity sufficient to store one frame. For example, in the NTSC system, one frame of pre-processed MPEG-1 pictures contains 352×240 pixels. Each pixel is represented by up to three bytes. Thus, in the NTSC system, the frame buffer 64 should be capable of storing maximum 352×240×3=253,440 bytes.

In response to an encoding command supplied from the CPU 58 through a system bus 66, an MPEG encoder 68 reads a data frame from the frame buffer 64 to compress the captured multimedia data. For example, a PCI bus may be used as the system bus 66. The MPEG encoder 68, described in more detail later, compresses the original pixel stream at about a 20 to 50 compression ratio. In accordance with the MPEG specification, an image is represented by an I-frame corresponding to a complete picture to be displayed. However, complete picture data are not required for some applications, for example, when only a portion of a picture is requested to be displayed. Accordingly, the encoder 68 is controlled by the CPU 58 to output a variable-size data block representing a fraction of the complete frame. The size of the data block is set by the CPU 58 and may vary from one macroblock to one complete frame (22×16 macroblocks for MPEG-1). The compressed image, graphics and text data are placed into a texture buffer 70 that may comprise separate sections for storing different types of data. As the system provides the compression of graphics and text data, together with the compression of image data, the storage capacity of the texture buffer 70 may be substantially reduced compared with a conventional personal computer. When a request for the stored multimedia data is received, for example, to display the data on a monitor 72, the CPU 58 issues a decoding command supplied via the system bus 66 to an MPEG decoder 74. In its command, the CPU 58 indicates the required type of data and the size of data block to be decoded. The MPEG decoder 74 reads the selected type of data from the texture buffer 70 in blocks of the selected size, and provides data decompression in accordance with the MPEG algorithm. The structure and operation of the decoder 74 are described in more detail later.

The decoded data block from the MPEG decoder 74 is supplied to a graphics engine 76 that manipulates the multimedia data to be displayed. If the graphics engine 76 has a direct interface with the MPEG decoder 74, the decoded data may be supplied directly to the graphics engine 76. Alternatively, the MPEG decoder 74 may transfer the decoded data to the graphics engine 76 via the system bus 66. A multiplexer 78 is provided at the input of the graphics engine 76 to accommodate a direct input from the MPEG decoder 74 and an input from the system bus 66.

Moreover, the graphics engine 76 has a non-compressed data input/output port 80 for receiving non-compressed graphics and text data from the system bus 66, and for supplying the system bus 66 with non-compressed graphics and image data. For example, the graphics engine 76 may receive non-compressed graphics and text data from internal sources in the personal computer, such as graphics and text generators. The received non-compressed data may be loaded into the texture buffer 70, and used by the graphics engine 76 for forming a picture on the monitor 72.

The graphics engine 76 is a graphics controller that provides a wide range of graphics operations to form a desired picture on the monitor 72, based on the decoded multimedia data supplied by the MPEG decoder 74 and the data stored in the texture buffer 70. For example, the graphics engine 76 may mix graphics, text and image data to create a combined picture on the screen of the monitor 72, or it may form a displayed image overlaid with a text or graphics. An 8514/8 Graphics Processor manufactured by the IBM Corporation is an example of the graphics engine 76. The picture formed by the graphics engine 76 is displayed by the monitor 72.

The MPEG decoder 74 outputs decoded data arranged in blocks of selected variable sizes. As discussed above, the size of the data block is set by the CPU 58 and may vary from one macroblock to one frame. Therefore, no intermediate buffering is required between the MPEG decoder 74 and the graphics engine 76 to store data to be displayed on the monitor 72. As a result, the data delivery rate of the MPEG system increases. By contrast, in a conventional MPEG system, a 4M-bit dynamic random access memory (DRAM) is required between an image decoder and a graphics controller, because the image decoder may outputs a complete MPEG-1 I-frame containing 22×16 macroblocks.

Figure 4:
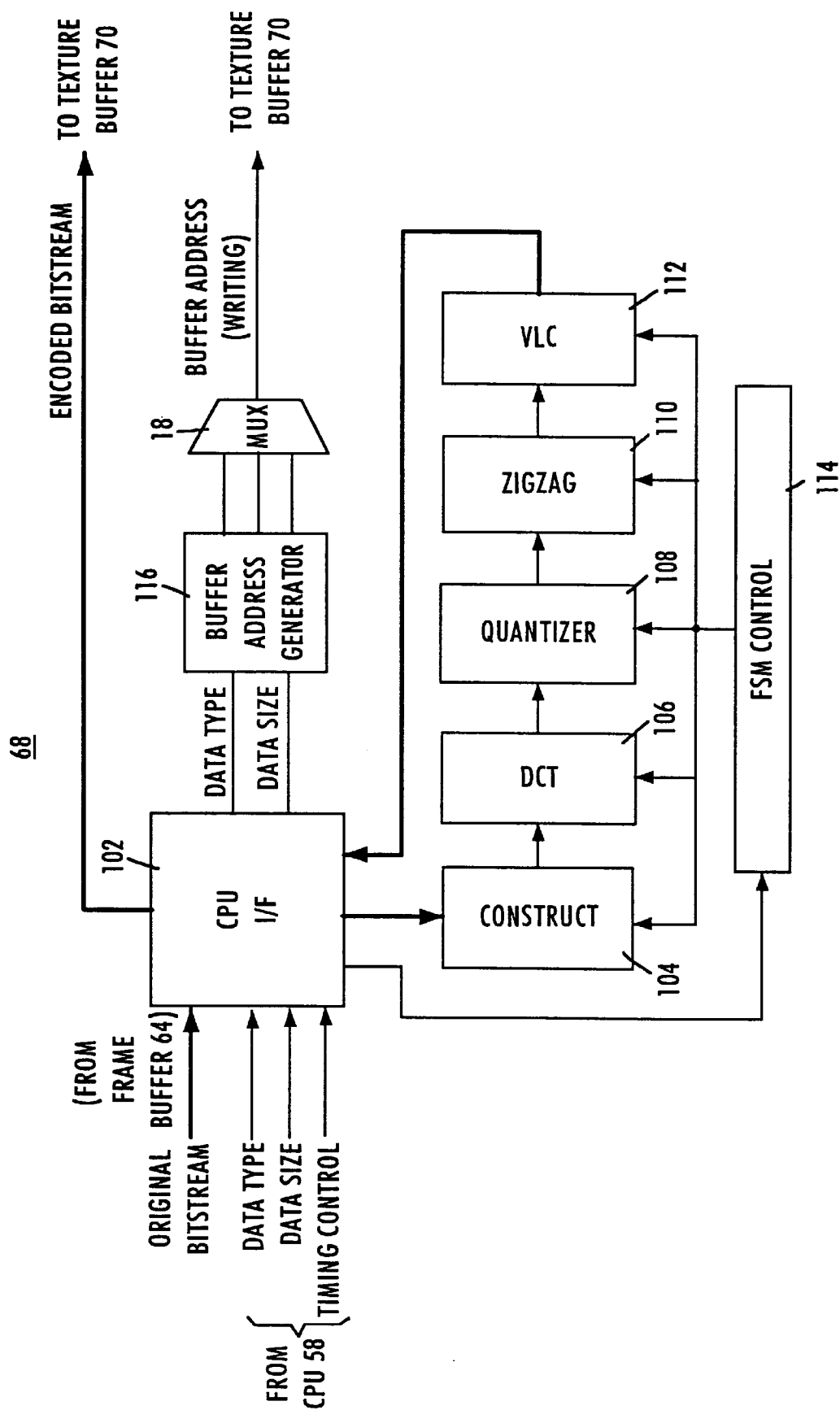
FIG. 4 is a block-diagram of the MPEG encoder shown in FIG. 3.

Referring to FIG. 4, the MPEG encoder 68 comprises an interface 102 that allows the encoder 68 to communicate with other units of the MPEG system 50. In particular, the interface 102 receives the original stream of pixels from the frame buffer 64 and transmits the compressed data to the texture buffer 70. The CPU 58 supplies the interface 102 with a timing control signal to time events that occur during the operation of the encoder 68. Also, the CPU 58 sends to the interface 102 data type and data size commands. The data type command indicates what type of data (image, graphics or text data) is represented by the received original stream. The data size command indicates the size of the compressed data block to be output to the texture buffer. As discussed above, for some applications, only a portion of a frame is required to be displayed or transmitted. Although the encoder 68 compresses a complete frame received from the frame buffer 64, it outputs only the required portion of the frame. The size of the data block supplied by the encoder 68 to the texture buffer 70 may vary from one macroblock to 22×16 macroblocks, depending on specific applications.

Via the interface 102, the original stream of pixels is supplied to a MPEG compression pipeline composed of a construction circuit 104, a discrete cosine transform (DCT) circuit 106, a quantizer 108, a zigzag encoder 110 and a variable length coder (VLC) 112. The operations carried out by the compression pipeline units are defined by the MPEG standards. In particular, the construction circuit 104 eliminates the temporal redundancy of the original stream by removing identical pixels in the stream. The DCT circuit 106 removes the spatial redundancy of the data by transforming the data into a matrix of DCT coefficients defined by the MPEG specification. The DCT matrix values represent intraframes that correspond to reference frames. The quantizer 108 divides the DCT values by a corresponding value from a standard MPEG Q-matrix to generate quantized DCT values. The remainder from the division process is discarded to reduce the size of data. The zigzag encoder 110 arranges the quantized set of DCT values in the order of a space filling zigzag curve representing a long run. The VLC 112 provides statistical encoding of the long run data in accordance with the Huffman Run-Length Coding Algorithm.

A control finite state machine (FSM) 114 controls the compression pipeline to enable various encoding units to operate simultaneously. The FSM 114 receives commands from the CPU 58 via the interface 102 to start encoding steps carried out by various units of the compression pipeline.

Via the interface 102, the compressed data from the compression pipeline are supplied to the texture buffer 70. A buffer address generator 116 provides the texture buffer 70 with address information required to store the compressed data, based on the data type and data size information from the interface 102. For example, the texture buffer 70 may comprise separate sections for storing image, graphics and text data. At its first output, the buffer address generator 116 may provide address data for storing compressed image data in the image section of the texture buffer 70. The second output of the address generator 116 may indicate address data for storing compressed graphics data in the graphics section of the texture buffer 70. Finally, the third output of the address generator 116 may provide address data for storing compressed text data in the text section of the texture buffer 70. A multiplexer 118 is coupled to the outputs of the address generator 116 to supply the texture buffer 70 with the address data corresponding to the type of compressed data at the output of the encoder 68. Alternatively, the image, graphics and text data may be stored in various locations of the same storage area. In this case, the address generator 116 provides addresses of locations for storing image, graphics and text data. As discussed above, the MPEG encoder 68 outputs a variable-size block of compressed data corresponding to a required portion of a frame.

Figure 5:
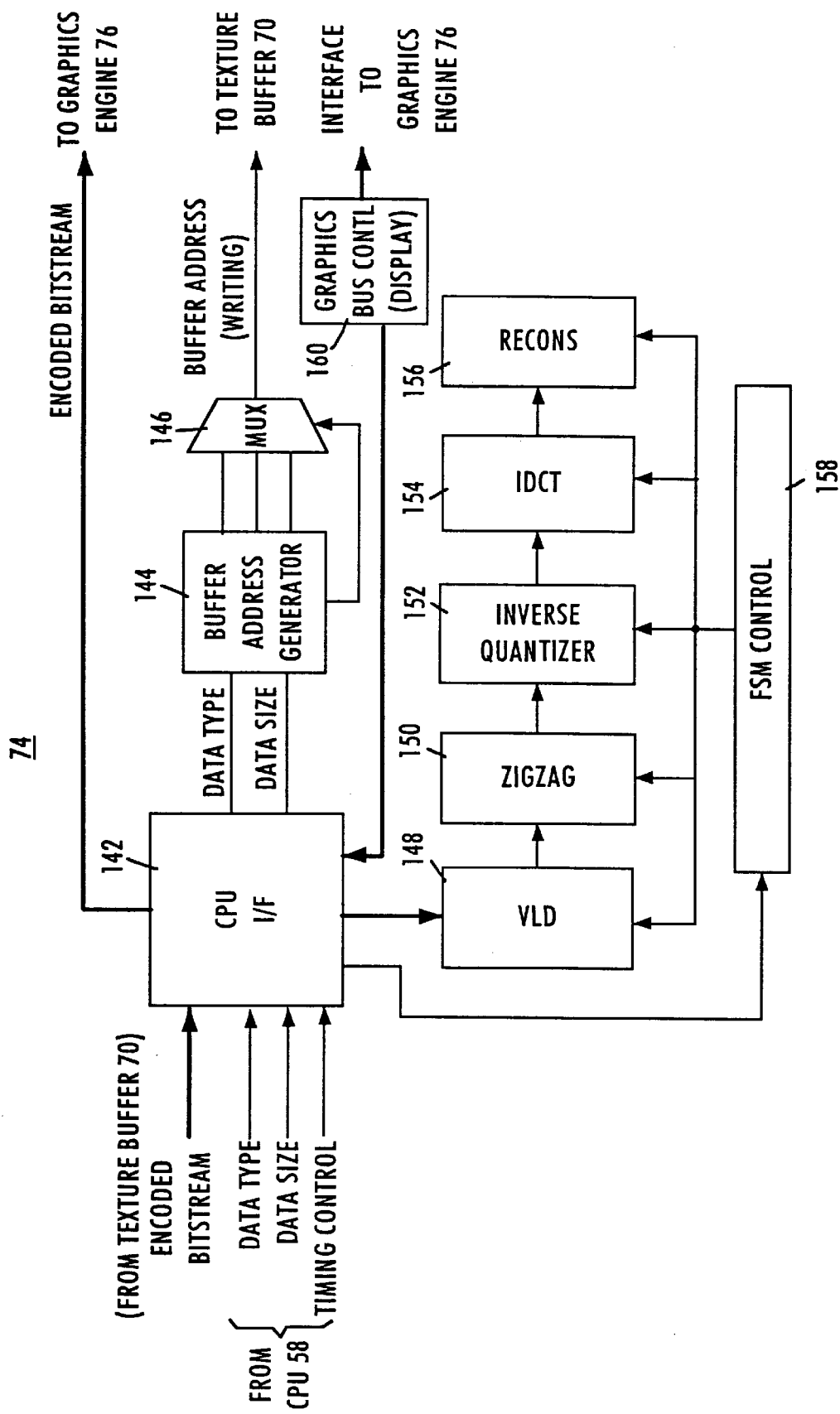
FIG. 5 is a block-diagram of the MPEG decoder shown in FIG. 3.

Reference is now made to FIG. 5 showing the MPEG decoder 74 that decompresses the image graphics and text data compressed by the MPEG encoder 68. In response to a decoding command from the CPU 58, the compressed data are supplied to an interface 142 that enables the decoder 74 to receive an encoded bitstream from the texture buffer 70, and to transfer decoded data to the graphics engine 76. The CPU 58 supplies the interface 102 with a timing control signal to time decoding events that occur during the operation of the decoder 74. Also, the CPU 58 sends to the interface 142 the data type and data size commands that indicate what type of data is being decoded, and the size of the data block to be read from the texture buffer. The size of the data block read by the decoder 74 from the texture buffer 70 may vary from one macroblock to 22×16 macroblocks.

The interface 142 supplies a buffer address generator 144 with the data type and data size information to calculate addresses for reading required compressed data blocks from the texture buffer 70. For example, at its first output, the address generator 144 may indicate image data addresses in the image section of the texture buffer 70. The second output of the address generator 144 may indicate graphics data addresses in the graphics section of the texture buffer 70. At its third output, the address generator 144 may indicate text data addresses in the text section of the texture buffer 70. If the image, graphics and text data are stored in the same storage area of the texture buffer 70, the address generator 144 provides addresses of locations where different types of data are stored. A multiplexer 146 is coupled to the outputs of the address generator 146 to select the addresses corresponding to a type of data being decoded.

The interface 142 reads from the texture buffer a data block of prescribed type and size, and sends it to a decompression pipeline composed of a variable length decoder (VLD) 148, a zigzag decoder 150, an inverse quantizer 152, an inverse discrete cosine transform (IDCT) circuit 154, and a reconstruction circuit 156. The operations of each decoding unit in the decoding pipeline are defined by the MPEG decompression specification. The VLD 148 decodes the incoming data in accordance with the Huffman Run-Length Decoding Algorithm. The zigzag decoder 150 generates the quantized DCT coefficients multiplied at the inverse quantizer 152 by the Q matrix table values in a process inverse to the compression process. At the IDCT circuit 154, the inverse transform of the discrete cosine transform is derived, and the output data in the spacial domain are supplied to the reconstruction circuit 156 to reconstruct the original data. In response to CPU instructions, a control finite state machine (FSM) 158 controls the decoding pipeline to enable various decodingunits to operate simultaneously.

The decompression pipeline supplies the decompressed data to graphics bus controller 160 that dispatches them to the graphics engine 76. If the graphics engine 76 is provided with a direct interface that enables it to communicate with the MPEG decoder 68, the graphics bus controller 160 sends the decompressed data to the interface 142 that supplies them directly to the graphics engine 76 via the multiplexer 78. If no direct decoding interface is available in the graphics engine 76, the graphics bus controller 160 may provide an interface with the system bus 66 to send the decompressed data through the system bus 66.

As the MPEG decoder 74 is able to read a data block having a variable size defined by the CPU 58, no intermediate data buffering is required between the MPEG decoder and the graphics engine.

Figure 6:
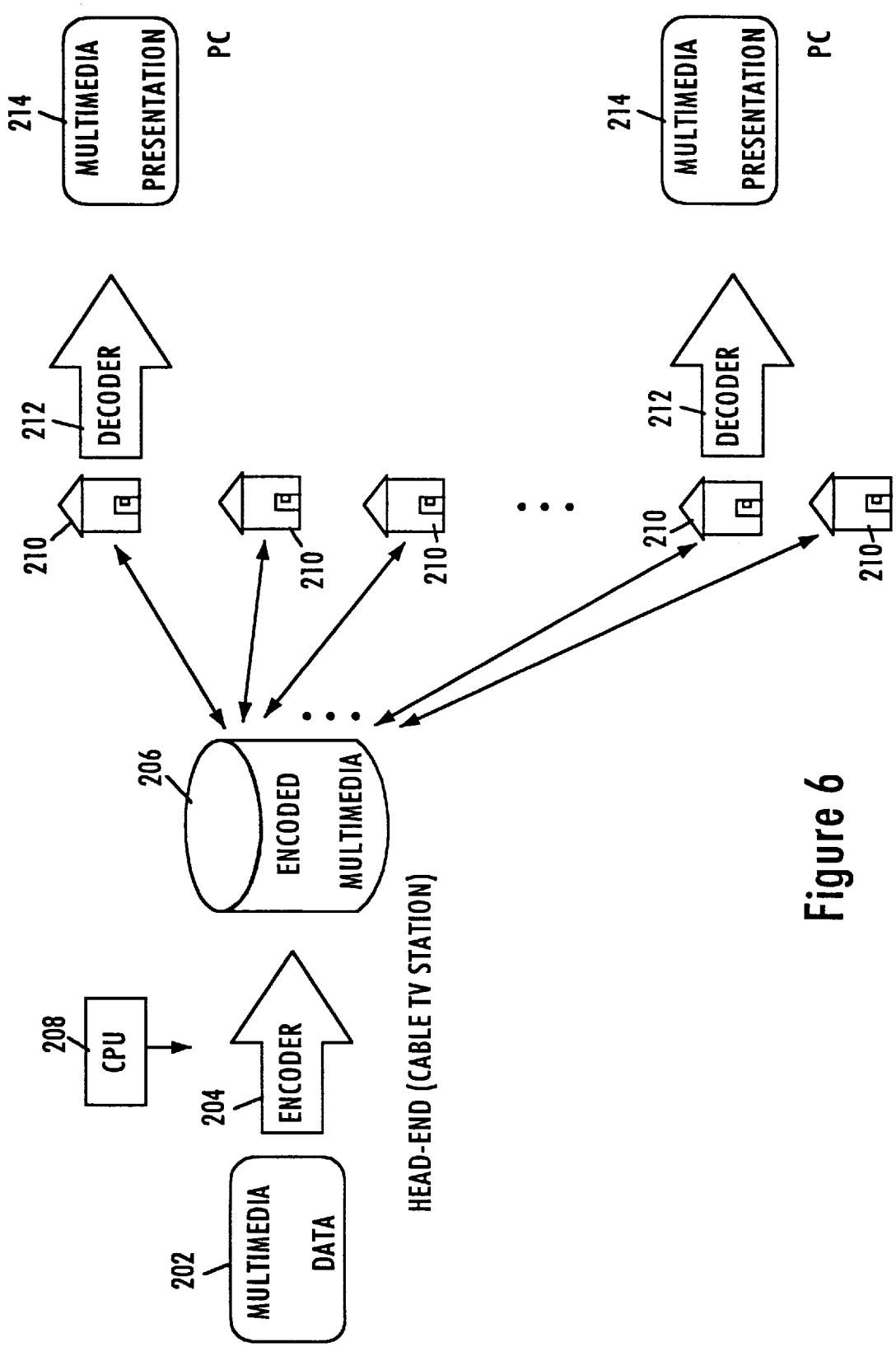
FIG. 6 is a schematic diagram illustrating implementation of the present invention in a video-on-demand system.

Reference is now made to FIG. 6 of the drawings schematically showing application of the multimedia encoding and decoding system of the present invention to a video-on-demand service. At a central location, for example, in a cable TV station, image, graphics and text data from a multimedia data source 202 are compressed by a MPEG encoder 204 in accordance with the MPEG standards. The compressed data may be stored in an encoded multimedia storage 206. The data compression process may be controlled by a CPU 208.

The central location is connected via TV cables or telephone lines to a plurality of peripheral locations 210. Each of the peripheral locations 210 is equipped with an MPEG decoder 212, and with a personal computer (PC) 214 capable of presenting multimedia information. When a user at one of the peripheral locations 208 sends a request for the multimedia data stored in the multimedia storage 206, the CPU 208 enables the MPEG decoder 212 associated with the user to read the requested data from the storage 206. Based on the user request, the CPU 208 provides the MPEG decoder 212 with data type and data size information to allow various types of data arranged in variable-size blocks to be read. Alternatively, the data type and data size information may be supplied by the PC 214. The MPEG decoder 212 decompresses the compressed image, graphics and text data, and supplies them to the PC 214 for displaying. As the encoding/decoding system of the present invention allows data blocks of variable size to be output from the MPEG decoder, no additional data storage at the peripheral location is required to buffer multimedia data before displaying. Moreover, the data delivery rate of the video-on-demand system substantially increases compared to conventional systems.

There accordingly has been described a multimedia data encoding and decoding system that allows various types of data arranged in variable-size blocks to be compressed and decompressed in accordance with the MPEG specifications. Frames of image, graphics and text data are supplied to the frame buffer. In response to an encoding command from the CPU, the MPEG encoder compresses the data from the frame buffer, and outputs to the texture buffer a variable-size data block that corresponds to the frame portion to be displayed. The size of the data block is set by the CPU, and may vary from one macroblock to 22×16 macroblocks (one MPEG-1 frame). The MPEG decoder reads the variable-size data block from the texture buffer, decompresses it and supplies to the graphics engine that manipulates various type of data to create a picture to be displayed at a video monitor.

As the multimedia data encoding and decoding system of the present invention is able to control the size of data blocks, no intermediate data buffering is required between the MPEG decoder and the graphics engine. As a result, the data delivery rate of the system increases.

In this disclosure, there are shown and described only the preferred embodiments of the invention, but it is to be understood that the invention is capable of changes and modifications within the scope of the inventive concept as expressed herein.

We claim:

1. A system for encoding and decoding multimedia data, including image and at least one of graphics and text data, comprising:
    an encoder for compressing the multimedia data,
    a central processor coupled to said encoder for arranging the multimedia data compressed by said encoder in a block of variable size,
    a decoder for decompressing the compressed multimedia data of variable block size, and
    a texture buffer coupled to said encoder for storing the block of the multimedia data compressed by said encoder,
    wherein said encoder comprises an address generator responsive to a data size command from the central processor indicating the size of the block, for generating address data for storing the block in the texture buffer.

2. The system of claim 1, wherein said encoder and said decoder provide compression and decompression in accordance with a Motion Picture Expert Group (MPEG) algorithm.

3. The system of claim 1, wherein said address generator is further responsive to a data type command from the central processor indicating a type of the multimedia data compressed by the encoder.

4. The system of claim 3, wherein said address generator provides separate image, graphics and text address outputs for indicating addresses for storing the image, graphics and text data, respectively, in the texture buffer.

5. The system of claim 1, wherein said texture buffer further stores non-compressed data.

6. The system of claim 5, further comprising a graphics engine for manipulating the multimedia data decompressed by said decoder and the non-compressed data stored in said texture buffer, to form a picture to be displayed.

7. The system of claim 6, wherein said graphics engine is provided with an input multiplexer for receiving the multimedia data directly from said decoder, and for receiving the multimedia data through a system bus.

8. A system for encoding and decoding multimedia data, including image and at least one of graphics and text data, comprising:
an encoder for compressing the multimedia data,
a central processor coupled to said encoder for arranging the multimedia data compressed by said encoder in a block of variable size,
a decoder for decompressing the compressed multimedia data of variable block size, and
a texture buffer coupled to said encoder for storing the block of the multimedia data compressed by said encoder,
wherein said decoder comprises an address generator responsive to a data size command from the central processor indicating the size of the block, for generating address data for reading the block from the texture buffer.

9. The system of claim 8, wherein said address generator is further responsive to a data type command from the central processor indicating a type of the multimedia data to be read by the decoder.

10. The system of claim 9, wherein said address generator provides separate image, graphics and text address outputs for indicating addresses for reading the image, graphics and text data, respectively, from the texture buffer.

11. A system for encoding and decoding multimedia data, including image and at least one of graphics and text data, comprising:
an encoder for compressing the multimedia data,
a central processor coupled to said encoder for arranging the multimedia data compressed by said encoder in a block of variable size, and
a decoder for decompressing the compressed multimedia data of variable block size,
said encoder and said decoder providing compression and decompression in accordance with a Motion Picture Expert Group (MPEG) algorithm,
wherein said encoder comprises:
a compression pipeline composed of encoding units for carrying out a sequence of encoding steps defined by the MPEG compression algorithm, and
a finite state machine responsive to said central processor for controlling said compression pipeline so as to enable various encoding units to operate simultaneously.

12. A system for encoding and decoding multimedia data, including image and at least one of graphics and text data, comprising:
an encoder for compressing the multimedia data,
a central processor coupled to said encoder for arranging the multimedia data compressed by said encoder in a block of variable size, and
a decoder for decompressing the compressed multimedia data of variable block size,
said encoder and said decoder providing compression and decompression in accordance with a Motion Picture Expert Group (MPEG) algorithm,
wherein said decoder comprises:
a decompression pipeline composed of decoding units for carrying out a sequence of decoding steps defined by the MPEG decompression algorithm, and
a finite state machine responsive to said central processor for controlling said decompression pipeline so as to enable various decoding units to operate simultaneously.

13. An MPEG system for compressing multimedia data comprising:
a central processor for controlling a compression process,
a multimedia data selector coupled to sources of image, graphics and text data, and responsive to said central processor for inputting the image, graphics and text data to be compressed,
an encoder responsive to said selector for compressing the image, graphics and text data in accordance with an MPEG compression algorithm, and
a texture buffer responsive to said encoder for receiving blocks of the image, graphics and text data compressed by said encoder,
said central processor controlling said encoder to vary sizes of the blocks supplied by said encoder.

14. The system of claim 13, wherein said encoder comprises an address generator responsive to a data size command from said central processor indicating the sizes of the supplied blocks, for generating address data for storing the blocks of the image, graphics and text data in said texture buffer.

15. The system of claim 14, wherein said address generator is further supplied with a type of data command from said central processor to indicate whether the image, graphics or text data are being compressed.

16. The system of claim 15, wherein said address generator provides separate address outputs for writing the image, graphics, and text data into said texture buffer.

17. An MPEG system for decompressing multimedia data comprising:
a central processor for controlling a decompression process,
a texture buffer for storing variable-size blocks of compressed image, graphics and text data,
a decoder responsive to said central processor for reading and decompressing the blocks of the image, graphics and text data stored in the texture buffer in accordance with the MPEG decompression algorithm, and
a multimedia monitor for displaying the image, graphics and text data decompressed by said decoder,
said central processor controlling said decoder to vary sizes of the blocks read by said decoder.

18. The system of claim 17, wherein said decoder comprises an address generator responsive to a data size command from said central processor indicating the sizes of the read blocks, for generating address data for reading the blocks of the image, graphics and text data from said texture buffer.

19. The system of claim 18, wherein said address generator is further supplied with a type of data command from said central processor to indicate whether the image, graphics or text data are being decompressed.

20. The system of claim 19, wherein said address generator provides separate address outputs for reading the image, graphics, and text data from said texture buffer.

21. A method of compressing and decompressing multimedia data, comprising the steps of:
   receiving image, graphics and text data to be compressed,
   compressing the image, graphics and text data in accordance with an MPEG compression algorithm,
   arranging the compressed image, graphics and text data into blocks of variable size,
   writing the blocks of variable size into a buffer,
   reading the blocks of variable size from the buffer, and
   decompressing the read image, graphics and text data in accordance with the MPEG decompression algorithm.

22. The method of claim 21, wherein said step of writing comprises forming addresses for writing the image, graphics and text data into the buffer based on a type of the data and the sizes of the blocks.

23. The method of claim 21, wherein said step of reading comprises forming addresses for reading the image, graphics and text data from the buffer based on a type of the data and the sizes of the blocks.

* * * * *